Patented Nov. 25, 1952

2,619,508

UNITED STATES PATENT OFFICE 2,619,508

POLYETHER-ALCOHOLS CONTAINING THIOETHER SIDE CHAINS

Louis A. Mikeska, Westfield, and Lawrence T. Eby, Linden, N. J., assignors to Standard Oil Development Company, a corporation of Delaware No Drawing. Application June 30, 1949, Serial No. 102,422

15 Claims. (Cl. 260—609)

This invention relates to a new class of compounds suitable for use as synthetic lubricants and as additives for mineral oil lubricants.

The new class of compounds of the present invention may be characterized broadly as polyether-alcohols containing thioether side chains. These compounds, more specifically defined in the description which follows, possess viscosity, viscosity index, pour point and load carrying properties which indicate their suitability for use without blending with other ingredients as lubricants. They may, however, be advantageously blended with mineral lubricating oils to improve the viscosity characteristics of the latter. When used alone or in blends with other lubricants, they may contain as additives antioxidants and detergents. The compounds, especially the modifications which contain chlorine, are useful as extreme pressure agents for mineral oil lubricants, and they are useful as ingredients in cutting oils. The compounds, when containing no chlorine or only very small quantities of the same, are also useful as additives for mineral lubricating oils to prevent bearing corrosion, especially when used with bearings of the copper-lead alloy type, and compounds of high molecular weight may be employed as pour depressants and as viscosity index improvers for mineral lubricating oils.

It is well known that alcohols may be reacted with ethylene oxide, propylene oxide, and other epoxides to form ether-alcohols and polyether-alcohols. These ether-alcohols normally contain simple saturated hydrocarbon radicals in the groups between the oxygen atoms. In the modification of these compounds which constitute the subject matter of the present invention a thioether group is present as a side chain attached to these interlinking hydrocarbon groups. Thus, the simplest form of the new compounds may be represented by the formula

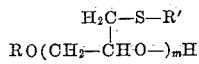

where R represents the alcohol residue, R' a hydrocarbon residue from a mercaptan or mercaptide, and m is a number indicating the number of mols of epoxide which have been reacted with one mol of the alcohol in the first step of the process.

To obtain a compound of this type, two methods have been found to be useful. In accordance with one method, an alcohol, phenol, or water is reacted with an epoxide containing an unsaturated group, such as 3,4-epoxy-1-butene, (sometimes called 1,2-butadiene monoxide), whereby there is formed an ether-alcohol containing at least one interlinking hydrocarbon group containing a side chain having a olefinic linkage. When this product is further reacted with a mercaptan, the components of the latter are added at the double bond and a saturated thioether group is thus formed.

By means of a second process herein described, the hydroxy compound is originally reacted with a chlorine-containing epoxide such as epichlorohydrin, whereby there is formed an ether-alcohol containing at least one interlinking hydrocarbon group having attached a chlorinated alkyl group. When this is reacted with a mercaptan compound, preferably a sodium alkyl mercaptide, sodium chloride is formed as a by-product and the mercaptan group becomes attached as a substitute for the chlorine atom, thus forming an ether-alcohol containing a thioether side chain.

In forming compounds useful in accordance with the present invention a mixture of the epoxide containing an unsaturated group or a chlorinated alkyl group with other epoxides such as ethylene oxide, propylene oxide, styrene oxide, or tetrahydrofurane, may likewise be employed in the original reaction with the alcohol or phenol. Furthermore, the reaction product of n-butyl alcohol and 3,4-epoxy-1-butene, for example, may be partially hydrogenated, and the resulting product would be the same as though a mixture of butylene oxide and 3,4-epoxy-1-butene had been used in the original reaction with n-butyl alcohol. Other partial hydrogenation products of a similar type may be used. There will accordingly be formed from such mixtures of epoxides a polyether-alcohol containing a chain of ether groups derived from the various epoxides present. However, in order that the final product may contain the specific characteristics of products of the present invention, it is desirable that the product contain, among its ether units, at least one-fourth which are of the specific character described above, that is, having a thioether side chain. For the purposes of this discussion an "ether group" or "ether unit" is the unit containing one oxygen atom and the hydrocarbon group or substituted hydrocarbon group linking the same with the next adjacent oxygen atom.

It may also be noted that the products which are formed by reacting the intermediate ether-alcohol containing an unsaturated group or a chloralkyl group with an insufficient quantity of mercaptan or mercaptide to convert all of the ether groups into groups containing a thioether side chain are useful in accordance with the present invention, provided also that the total number of such unreacted ether groups, together with the ether groups introduced by means of epoxides containing no unsaturated or chlorinated groups, does not constitute more than three-fourths of the total number of ether groups present.

The compounds formed as the final products of the above described methods contain a terminal hydroxyl group or groups, and accordingly they have the characteristics of alcohols, such as the ability to form esters. Such esters, formed by reacting these hydroxy compounds with organic acids, for example, with fatty acids, naphthenic acids, aromatic acids, or other carboxylic acids, or their corresponding halides or with other acids such as carbonic acid, xanthic acids, carbamic acids or their derivatives, or with phosphoric or thiophosphoric acids and organic derivatives of the same, or with sulfuric acid and organic derivatives thereof, are likewise useful as synthetic lubricants and as additives for mineral lubricating oils in accordance with the present invention.

The new polyether-thioether alcohol compounds of the present invention may be broadly and more precisely defined by means of the formula $$R[-O(-WO-)_m(-XO-)_n(-YO-)_p(-ZO-)_qH]_r$$

where R represents hydrogen or a hydrocarbon radical containing one to thirty carbon atoms. Such hydrocarbon radicals may be saturated or unsaturated, straight chain or branched aliphatic radicals, or they may be aromatic radicals or aromatic radicals containing aliphatic side chains. W in the formula represents the group

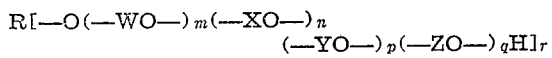

in which R' is an aliphatic hydrocarbon radical, saturated or unsaturated, of one to thirty carbon atoms, and V is an alkylene radical containing one to two carbon atoms. It is immaterial whether this group is arranged in the molecule so that the thioether side chain is nearer or farther from the group R than the CH₂ group. X of the above general formula represents the group

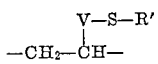

and Y represents the group

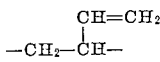

Normally, groups of the types X and Y will not be present in the same molecule, since each is an unreacted residue of the product formed in the first step of the process, i. e., in the reaction with 3,4-epoxide-1-butene or epichlorohydrin. Z of the formula represents an alkylene radical containing two to four carbon atoms, being derived from an admixed portion of ethylene oxide, propylene oxide, butylene oxide, or tetrahydrofurane. $m$ in the formula is an integer from three to forty, $n$, $p$ and $q$ are numbers, 0 or greater, which satisfy the requirements that $$\frac{m+n+p}{q} \geq 1/3$$

and $$\frac{m}{n+p+q} \geq 1/3$$

$r$ represents one or two, according to whether the epoxide was reacted with a monohydroxy or dihydroxy compound.

As described above, one of the methods of preparing the compounds of the present invention involves as a first step the reaction of a hydroxy compound with 3,4-epoxy-1-butene. This reaction is preferably conducted in the presence of a catalyst, such as boron fluoride, stannic chloride, or an alkali metal hydroxide. When boron fluoride or stannic chloride is used, the reaction is preferably conducted at temperatures not higher than 100° C., while with alkali metal hydroxides a temperature of the order of 100-150° C. is preferable. The reaction may be caused to take place with or without the presence of an inert solvent, according to whether the reaction mixture is sufficiently fluid. Suitable inert solvents are toluene, xylene, dibutyl ether, dioxane, diamyl sulfide, and the like. With regard to the choice of catalyst, it may be noted that a product somewhat more resistant to heat decomposition is produced when the alkaline catalyst is employed, since with that catalyst products are formed in which the various ether units are so linked that each oxygen atom is adjacent to one primary and one secondary carbon atom. With other catalysts, the product contains a large proportion of linkages in which an oxygen atom is adjacent to two secondary carbon atoms, and such compounds are more liable to thermodegradation.

After the completion of the reaction, when boron fluoride is employed as catalyst, it is desirable to prevent further activity of the catalyst, as by pouring the reaction mixture into an aqueous sodium bicarbonate solution. The product may be extracted from the mixture by means of a suitable solvent such as ether, and the solvent removed by distillation or evaporation.

In the second step of the reaction, the ether-alcohol product is contacted with a mercaptan at a temperature which may range from room temperature up to about 200° C., care being taken not to employ a temperature high enough to decompose either of the reactants. The reaction may take place with or without an inert solvent, such as those listed above in connection with the alcohol-epoxide reaction. The reaction will take place without a catalyst, but catalysts may advantageously be employed, such as boron fluoride, hydrogen fluoride, stannic chloride, peroxide catalysts, ultraviolet light, and in general any catalyst known to promote the reaction of mercaptans with olefinic materials. The course of the reaction may be followed by titrating a small sample of the reaction mixture from time to time with an iodine solution, whereby the loss of mercaptan through chemical reaction is measured.

The products of the present invention may be prepared, as indicated above, by a second method in accordance with which a chlorine-substituted epoxide, such as epichlorohydrin, is reacted with a hydroxy compound to first form an ether-alcohol containing one or more chlorine-substituted side chains. This reaction may be conducted in a manner similar to that employed for the reaction between 3,4-epoxy-1-butene and an alcohol, and the same type of catalysts may be employed. Boron fluoride is particularly suitable. Chloroform has been found to be a very suitable solvent, where a solvent is required. In the second step of the process, however, where the ether-alcohol is reacted with a mercaptan, it is preferable in this case to first convert the mercaptan into an alkali metal mercaptide. This facilitates removal of the chlorine as by-product alkali metal chloride. Normally, a solvent is chosen in which the metallic chloride is insoluble, thus facilitating the removal of the metal chloride by filtration or decantation. Dioxane has been found to be a particularly suitable solvent.

The hydroxy compounds which may be employed in forming the ether-alcohols in the first step of the process of the present invention, using either of the procedures described above, include water, alcohols, glycols, phenols, naphthols, and in general organic compounds having one or two hydroxyl groups attached to a hydrocarbon radical. Monohydric alcohols are the preferred group of hydroxy compounds and these include saturated and unsaturated, straight and branched chain compounds. Typical of these are methyl alcohol, ethyl alcohol, n-butyl alcohol, n-hexyl alcohol, 2-ethylhexyl alcohol, cetyl alcohol, oleyl alcohol, and the like. A group of alcohols of commercial interest which are suitable for the purposes of the present invention are the so-called "Oxo" alcohols, prepared by the reaction of carbon monoxide and hydrogen upon the olefins obtainable from petroleum products and hydrogenation of the resulting aldehydes. Alcohols within the range $C_7$ to $C_{14}$ are among those which are obtainable from this process. These alcohols are primary alcohols and they normally have a branched chain structure. Glycols which are useful include ethylene glycol, the propylene glycols, and the like, as well as diethylene glycol and other polyalkylene glycols. The phenols which may be employed include phenol itself as well as alkylated phenols, e. g., cresol, n-butyl phenol, diamyl phenols, tertiary octyl phenol, wax-alkylated phenols, etc. Phenols derived from petroleum may also be used.

The mercaptans which may be employed in the second step of the reaction to supply the thioether linkage include the alkyl and alkylene mercaptans, straight chain or branched, containing one to thirty carbon atoms per molecule. These include mercaptans of low molecular weight, such as ethyl mercaptan, n-butyl mercaptan, and the like, as well as those of higher molecular weight. A commercial product consisting of a mixture of mercaptans of the $C_{10}$ to $C_{16}$ range, derived from reduced cocoanut oil and known as "Lorol" mercaptan, is particularly suitable.

It has been indicated above that the products of the present invention have a number of uses in connection with lubricant compositions, including their use as such in the capacity of synthetic lubricants, as well as in the form of additives for mineral lubricating oils, in which they serve various purposes. In specific cases, compounds of a specific molecular weight range will be chosen in accordance with the specific use contemplated. For example, when the materials are to be employed as such as synthetic lubricants, products of molecular weight of 300 to about 3,000 will normally be employed. When used as extreme pressure agents for mineral oils, the molecular weight range may extend from about 300 to about 5,000 or somewhat higher, and in their capacity as viscosity index improvers they may have a range of the order of 2,000 to 20,000. The compounds which are most suitable for use as pour depressants for mineral oils are in general those with straight chain radicals of about the $C_8$ to $C_{16}$ range. For antioxidant and corrosion inhibiting purposes the compounds may be of any type up to about 20,000 molecular weight.

When the products of the present invention are employed as additives for mineral oil lubricants, the concentration of the additive in the mineral oil will vary according to the particular function which the additive is to exert in specified compositions. For example, when the additive is to be employed primarily as an extreme pressure agent or viscosity index improver, the concentration most suitable is from about 0.5 to about 10% by weight; when used as a pour depressor, the concentration will usually vary from 0.1% to about 3%; and when used primarily for antioxidant and corrosion inhibiting purposes, the concentration is of the order of about 0.02% to about 2%. The proportions giving the best results will naturally vary according to the nature of the specific additive. For commercial purposes, it is convenient to prepare concentrated oil solutions in which the amount of additive in the composition ranges from 25 to 50% by weight and to transport and store them in such form. In preparing a lubricating oil composition for use as a crankcase lubricant the additive concentrate is merely blended with the base oil in the required amount.

Below are given detailed descriptions of preparations for examples of products prepared in accordance with the methods described above, with indications of physical properties of the same. It is to be understood that these examples are given as illustrations of the present invention and are not to be construed as limiting the scope of the invention in any way.

*Example 1*

37.1 grams (0.5 mol) of n-butyl alcohol and 1.7 grams (0.025 mol) of boron fluoride were placed in a 1-liter, 3-necked, round bottom flask equipped with stirrer, return condenser, thermometer and dropping funnel. While maintaining a reaction temperature of 25 to 30° C., 333.8 grams (4.77 mols) of 3,4-epoxy-1-butene was added. After stirring three hours longer, the reaction mixture was poured into 25 cc. of saturated aqueous sodium bicarbonate solution and extracted with ether. The ether layer was dried over anhydrous potassium carbonate, filtered, and stripped of volatile constituents by distillation up to 200° C. at 1.5 mm. Hg pressure. The residue was a reddish brown liquid which weighed 219.0 grams and had the following analysis: 67.16% carbon, 9.60% hydrogen (23.24% oxygen by difference), iodine number =298.4 cg. of iodine per gram or an equivalent weight per double bond of 85.1, acetyl number =107 mg. KOH per gram or an equivalent weight per hydroxyl group of 524, kinematic viscosity=5.66 centistokes at 210° F. and 41.42 centistokes at 100° F. (76.4 V. I. or 0.786 ASTM Slope), ASTM Pour=<−35° F.

A 500 ml. double-necked flask equipped with return condenser and a thermometer was charged with 85.1 grams of the unsaturated polyetheralcohol prepared as described above and 233 grams (0.96 mol) of "Lorol" mercaptan. A slow stream of air was bubbled into the mixture during the reaction. The temperature was gradually raised over a period of 5 hours from 93° to about 130° C. and maintained at the latter temperature for nearly 5 days. During this time 1 ml. samples were removed hourly and titrated with approximately tenth normal iodine solution to follow the loss of mercaptan through chemical reaction. The amount of iodine solution which was equivalent to 1 ml. of reaction mixture dropped from 24.5 ml. to 8.2 ml. At the end of this time the product was filtered into a Claisen flask and distilled. A few drops came over below 77° C. at less than 1 mm. Hg pressure, 77.1 grams came overhead at 77–119° C. at the same pressure with a bath temperature of 200° C. The residue was a brown red liquid which weighed 221.9 grams and had the following analysis: 70.56% carbon, 11.93% hydrogen, 9.51% sulfur (Parr bomb), (8.00% oxygen by difference), acetyl number =55.7 mg. KOH per gram or an equivalent weight per hydroxyl group of 1007, iodine number=103.3 cg. iodine per gram or an equivalent weight per double bond of 246, kinematic viscosity=12.27 centistokes at 210° F. and 90.50 centistokes at 100° F. (126.8 V. I. or 0.627 ASTM Slope). These results indicate that the final product contains about 70 mol per cent of the thioether substituted groups and about 30 mol per cent of unreacted unsaturated groups.

*Example 2*

7.4 grams (0.1 mol) of n-butyl alcohol and 0.68 gram (0.1 mol) of boron fluoride were placed in a 500 ml., 3-necked, round bottom flask equipped with stirrer, return condenser, thermometer, and dropping funnel. From the dropping funnel was added 287.5 grams (3 mols) of epichlorohydrin over a period of 3 hours at 35 to 40° C. After the first 40 grams of epichlorohydrin was added, the mixture became very viscous, so that 50 ml. of chloroform was added as a diluent. Another 50 ml. of chloroform was added after about 200 grams of the epichlorohydrin had been added. Stirring was continued for an additional 2½ hours at room temperature. The mixture was dissolved in ether and washed with saturated aqueous sodium bicarbonate. The ether layer was dried, filtered and distilled from a Claisen flask to remove volatile constituents. The residue from distillation up to 145° C. bath temperature and 2 mm. Hg pressure was a brown viscous liquid weighing 279.1 grams. A cryoscopic molecular weight determination in p-bromotoluene gave an average of 1700 for this residual oil.

A sodium mercaptide in dioxane mixture was made by adding 27 grams (0.5 mol) of sodium methoxide to a solution of 101 grams (0.5 mol) of "Lorol" mercaptan. To this mixture was added a solution of 46.3 grams (0.5 atom-gram of Cl in the oil) of the chlorinated polyether-alcohol prepared as described above, 50 ml. of absolute methanol, and 50 ml. of dioxane. The mixture was refluxed for 4½ hours during which time about 80 ml. of alcohol and dioxane were removed from the return condensate at the beginning of reflux. The mixture was cooled, poured into water, acidified with hydrochloric acid and extracted with ether. The ether layer was washed and dried over anhydrous sodium sulfate. The mixture was filtered, stripped of solvent on a steam bath and then further stripped of volatile constituents by distillation from a Claisen flask, finishing at 165° C. at 2 mm. Hg pressure. The residual oil was a brown viscous liquid weighing 117.7 grams. It contained only a trace of organic-bound chlorine.

*Example 3*

The procedure of Example 2 was followed except that 30 grams of sodium methoxide with 120 grams of "Lorol" mercaptan were used in the second reaction step. The residual oil was obtained by stripping to 200° C. at 2 mm. Hg pressure. It was a dark red oil weighing 129.5 grams with the following analysis: 70.00% carbon, 11.87% hydrogen, 11.22% sulfur, 1.28% chlorine, acetyl number=31.8 mg. KOH per gram or an equivalent weight per hydroxyl group of 1760, kinematic viscosity=14.73 centistokes at 210° F. and 95.9 centistokes at 100° F. (138.5 V. I. or 0.566 ASTM Slope). The analysis indicates that the product contains about 90 mol per cent of the thioether substituted groups and about 10 mol per cent of unreacted chloralkyl groups. The pour point (ASTM) of an oil with an original pour point of 30° F. was reduced to 25° F., 20° F. and 5° F. by the addition of 0.25%, 0.5% and 1.0%, respectively, of the residual oil of this example.

*Example 4*

A solution of 46.3 grams (0.5 atom grams of chlorine) of the chlorinated polyether-alcohol of Example 2 and 100 ml. of dioxane was added to the sodium mercaptide from 27 grams (0.5 mol) of sodium methylate, 73 grams (0.5 mol) of tertiary octyl mercaptan (from the reaction of diisobutylene and hydrogen sulfide in the presence of boron fluoride) and 250 ml. of dioxane. The mixture was refluxed and the binary mixture of methanol and dioxane was removed from the return condensate. After the distilling temperature reached 101° C., the refluxing was continued until a total of 5 hours had elapsed. The mixture was cooled, poured into water, acidified with hydrochloric acid and extracted with ether. The ether layer was dried over anhydrous sodium sulfate, filtered and stripped of volatile constituents up to 180° C. at 2 mm. Hg pressure. The residual oil was a red brown viscous liquid weighing 89 grams with the following analysis: 64.20% carbon, 10.83% hydrogen, 14.80% sulfur, 1.66% chlorine, kinematic viscosity=107.7 centistokes at 210° F. and 345.8 centistokes at 100° F. (0.256 ASTM Slope). The analysis indicates the presence of about 90 mol per cent of thioether substituted groups and about 10 mol per cent of unreacted chloralkyl groups in the final product. Blends of this viscous oil with a high V. I. paraffinic lubricating oil (acid treated and phenol extracted) improved the viscosity temperature characteristics of the oil (lower ASTM Slope), as shown in the following table:

| Product of Example 4, percent | Hydrocarbon Oil, percent | Viscosity at 210° F. (Centistokes) | Viscosity at 100° F. (Centistokes) | ASTM Slope |
|---|---|---|---|---|
| 10 | 90 | 6.33 | 48.3 | 0.770 |
| 20 | 80 | 7.65 | 54.1 | 0.705 |
| 30 | 70 | 9.44 | 76.8 | 0.699 |

*Example 5*

Two ml. of boron fluoride ethyl ether (containing 45% boron fluoride) was added to 5.6 grams (0.09 mol) of ethylene glycol and 50 ml. of chloroform in a flask with stirrer, condenser, thermometer and dropping funnel. While keeping the temperature below 40° C., there was added 185 grams (2 mols) of epichlorohydrin over a period of 2⅓ hours. The temperature was between 35 and 40° C. most of the time. Stirring was continued another 20 minutes and then aqueous sodium bicarbonate was added. The mixture was extracted with chloroform and the organic layer dried over anhydrous potassium carbonate. It was filtered and the volatile constituents removed by distillation from a Claisen flask up to 150° C. at 2 mm. Hg pressure. The residue was a gray very viscous liquid weighing 178.3 grams. A cryoscopic molecular weight determination in p-bromotoluene gave an average of 1630 for this residual oil.

*Example 6*

A 2-liter, 3-necked, round bottom flask equipped with a stirrer, thermometer, and return condenser with trap was charged with 56 grams of sodium methoxide, 230 grams of "Lorol" mercaptan and 500 ml. of dioxane. A solution of 92.5 grams of the residual oil from Example 5 and 200 ml. of dioxane was added. The mixture was refluxed 4½ hours during which time 240 ml. of distillate was removed and the distilling temperature rose from 86 to 102° C. Water and ether were added and the mixture acidified with hydrochloric acid. The ether layer was washed free of HCl and dried over anhydrous sodium sulfate. The material was filtered and stripped of volatile constituents by distillation from a Claisen flask up to 200° C. at 2 mm. Hg pressure. The residue was an orange-brown viscous liquid which weighed 252.6 grams. The residual oil analyzed as follows: acetyl number=37 mg. KOH per gram or an equivalent weight per hydroxyl group of 1520.

Further illustrations of reaction mixtures which are of particular interest and which may be employed in producing an ether-alcohol in the first step of the process of the present invention are listed below, the numbers referring to the relative molecular proportions of the compounds in each mixture.

1 n-butyl alcohol, 7 propylene oxide, 7 3,4-epoxy-1-butene
1 n-butyl alcohol, 7 tetrahydrofurane, 7 3,4-epoxy-1-butene
1 n-butyl alcohol, 3 styrene oxide, 6 3,4-epoxy-1-butene
1 n-butyl alcohol, 7 propylene oxide, 7 epichlorohydrin
1 n-butyl alcohol, 2 propylene oxide, 5 epichlorohydrin
1 n-butyl alcohol, 2 styrene oxide, 5 epichlorohydrin
1 $C_9$ "Oxo" alcohol, 8 epichlorohydrin
1 n-butyl alcohol, 7 epichlorohydrin, 7 3,4-epoxy-1-butene
1 n-butyl alcohol, 3 propylene oxide, 5 epichlorohydrin, 5 3,4-epoxy-1-butene Any of the above mixtures may be reacted with a mercaptan or mercaptide in the manner hereinbefore described to form products illustrating the present invention.

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, thiophosphates, phosphites and thiophosphites, metal salicylates, metal xanthates and thioxanthates, methal thiocarbamates, amines and amine derivatives, reaction products of metal phenates and sulfur, reaction products of metal phenates and phosphorus sulfides, metal phenol sulfonates, and the like. Thus the additives of the present invention may be used in lubricating oils containing such other addition agents as barium tert.-octyl-phenol sulfide, calcium tert.-amylphenol sulfide, nickel oleate, barium octadecylate, calcium phenyl stearate, zinc diisopropyl salicylate, aluminum naphthenate, calcium cetyl phosphate, barium di-tert.-amylphenol sulfide, calcium petroleum sulfonate, zinc methylcyclohexyl thiophosphate, calcium dichlorostearate, etc. Other types of additives, such as phenols and phenol sulfides, may be employed.

The lubricating oil base stocks used in the compositions of this invention may be straight mineral lubricating oils or distillates derived from paraffinic, naphthenic, asphaltic, or mixed base crudes, or, if desired, various blended oils may be employed as well as residuals, particularly those from which asphaltic constituents have been carefully removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc. Hydrogenated oils or white oils may be employed as well as syntheic oils prepared, for example, by the polymerization of olefins or by the reaction of oxides of carbon with hydrogen or by the hydrogenation of coal or its products. In certain instances, cracking coil tar fractions and coal tar or shale oil distillates may also be used. Also, for special applications, animal, vegetable, or fish oils, or their hydrogenated or voltolized products, may be employed in admixture with mineral oils.

For the best results the base stock chosen should normally be that oil which without the new aditive present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds (Saybolt) viscosity at 210° F. For the lubrication of certain low and medium speed diesel engines, the general practice has often been to use a lubricating oil base stock prepared from naphthenic or aromatic crudes and having a Saybolt viscosity at 210° F. of 45 to 90 seconds and a viscosity index of 0 to 50. However, in certain types of diesel engine and gasoline engine service, oils of higher viscosity index are often preferred, for example, up to 75 to 100, or even higher, viscosity index.

In addition to the material to be added according to the present invention, other agents may also be used such as dyes, pour depressants, foam depressants, heat thickened fatty oils, sulfurized fatty oils, organo-metallic compounds, metallic or other soaps, sludge dispersers, antioxidants, thickeners, viscosity index improvers, oiliness agents, resins, rubber, olefin polymers, silicones, voltolized fats, voltolized mineral oils, and/or voltolized waxes and collodial solids such as graphite or zinc oxide, etc. Solvents and assisting agents, such as esters, ketones, alcohols, aldehydes, halogenated or nitrated compounds, and the like, may also be employed.

Assisting agents for additives which are particularly desirable as plasticizers and defoamers are the higher alcohols having eight or more carbon atoms and preferably twelve to twenty carbon atoms, e. g., lauryl alcohol, stearyl alcohol, wax oxidation alcohols, and the like.

In addition to being employed in crankcase lubricants the additives of the present invention may also be used in extreme pressure lubricants, engine flushing oils, industrial oils, general machinery oils, process oils, rust preventive compositions and greases.

What is claimed is:

1. As a new composition of matter a compound of the formula

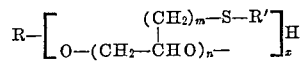

wherein R is an alcohol residue selected from the class consisting of the residues of monohydric aliphatic alcohols, glycols and polyglycols, R' is an aliphatic hydrocarbon residue from a material selected from the class consisting of mercaptans and mercaptides, $n$ is an integer from 3 to 40, and $m$ is an integer from 1 to 2 and $x$ is an integer from 1 to 2.

2. A composition according to claim 1 wherein R is an alcohol residue containing from 1 to 30 carbon atoms, R' contains from 1 to 30 carbon atoms, $n$ is a number from 3 to 40, and $m$ is 2.

3. A composition according to claim 1 wherein R contains from 1 to 30 carbon atoms, R' contains from 1 to 30 carbon atoms, $n$ is a number from 3 to 40, and $m$ is 1.

4. A composition of matter according to claim 1 wherein R contains 4 carbon atoms, R' contains from 10 to 16 carbon atoms, $n$ contains from 3 to 40 carbon atoms, and $m$ is 2.

5. A composition according to claim 1 wherein R contains 4 carbon atoms, R' contains from 10 to 16 carbon atoms, $n$ is a number from 3 to 40, and $m$ is 1.

6. The method of forming a synthetic organic compound which comprises reacting the reaction product of one molar proportion of a $C_1$–$C_{30}$ alcohol selected from the group consisting of monohydric alcohols, glycols and polyglycols and 3 to 40 molecular proportions of 3,4-epoxy-1-butene with a $C_1$–$C_{30}$ mercaptan at a reacting temperature.

7. A method according to claim 6 in which the reaction is conducted in the presence of a boron fluoride catalyst.

8. The method of forming a synthetic organic compound which comprises reacting the reaction product of one molar proportion of a $C_1$–$C_{30}$ monohydric alcohol and 3 to 40 molecular proportions of 3,4-epoxy-1-butene with a $C_1$ to $C_{30}$ mercaptan at a reacting temperature.

9. A method according to claim 8 in which the alcohol is n-butyl alcohol.

10. A method according to claim 8 in which the alcohol is n-butyl alcohol and in which the mercaptan is a mercaptan containing 10 to 16 carbon atoms per molecule.

11. A method according to claim 8 in which the reaction is conducted in the presence of a boron fluoride catalyst.

12. The method of forming a synthetic organic compound which comprises reacting the reaction product of one molar proportion of a $C_1$–$C_{30}$ alcohol selected from the group consisting of monohydric alcohols, glycols and polyglycols and 3 to 40 molecular proportions of epichlorhydrin with a $C_1$–$C_{30}$ mercaptan at a reacting temperature.

13. A method according to claim 12 in which the reaction is conducted in the presence of a boron fluoride catalyst.

14. The method of forming a synthetic organic compound which comprises reacting the reaction product of one molar proportion of n-butyl alcohol with 30 molecular proportions of epichlorhydrin with sodium "Lorol" mercaptan so that there is present one mol of such mercaptan for each gram atom of chlorine in said reaction product, in the presence of a mixture of equal volumes absolute mehanol and dioxane as the solvent at a refluxing temperature, and separating the sodium chloride and solvent from the reaction product.

15. The method of forming a synthetic organic compound which comprises reacting the reaction product of one molar proportion of a $C_1$–$C_{30}$ alcohol selected from the class consisting of monohydric alcohols, glycols and polyglycols with 3 to 40 molecular proportions of a compound selected from the group consisting of epichlorhydrin and 3,4-epoxy-1-butene with a mercaptan containing from 1 to 30 carbon atoms per molecule at a reacting temperature.

LOUIS A. MIKESKA.
LAWRENCE T. EBY.

REFERENCES CITED

The following references are of record in the file of this patent:

UNITED STATES PATENTS

| Number | Name | Date |
|---|---|---|
| 2,131,120 | Schlack | Sept. 27, 1938 |
| 2,205,021 | Scheutte | June 18, 1940 |
| 2,404,425 | Beanblossom | July 23, 1946 |
| 2,419,586 | Otto | Apr. 29, 1947 |
| 2,431,010 | Zimmer | Nov. 18, 1947 |
| 2,442,339 | Britton et al. | June 1, 1948 |
| 2,460,436 | Shoemaker et al. | Feb. 1, 1949 |
| 2,484,370 | Ballard et al. | Oct. 11, 1949 |
| 2,504,082 | Neher et al. | Apr. 11, 1950 |